US011631017B2

(12) United States Patent
White et al.

(10) Patent No.: US 11,631,017 B2
(45) Date of Patent: Apr. 18, 2023

(54) FEDERATED INTELLIGENT ASSISTANCE

(71) Applicant: Microsoft Technology Licensing, LLC, Redmond, WA (US)

(72) Inventors: Ryen White, Woodinville, WA (US); Girish Sthanu Nathan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1271 days.

(21) Appl. No.: 15/866,257

(22) Filed: Jan. 9, 2018

(65) Prior Publication Data

US 2019/0213490 A1  Jul. 11, 2019

(51) Int. Cl.
| | | |
|---|---|---|
| *G06N 5/04* | (2006.01) | |
| *G10L 15/18* | (2013.01) | |
| *G06F 9/451* | (2018.01) | |
| *G06N 20/00* | (2019.01) | |
| *G06F 16/332* | (2019.01) | |
| *G06Q 10/10* | (2012.01) | |
| *G10L 15/26* | (2006.01) | |
| *G06N 5/043* | (2023.01) | |

(52) U.S. Cl.
CPC .............. *G06N 5/043* (2013.01); *G06F 9/453* (2018.02); *G06F 16/3329* (2019.01); *G06N 20/00* (2019.01); *G06Q 10/10* (2013.01); *G10L 15/1822* (2013.01); *G10L 15/26* (2013.01)

(58) Field of Classification Search
CPC ........ G06N 5/043; G06N 20/00; G06F 9/453; G06F 16/3329; G06Q 10/10; G10L 15/1822; G10L 15/26
See application file for complete search history.

(56) References Cited

U.S. PATENT DOCUMENTS 9,172,747 B2 *  10/2015  Walters ................. G06Q 30/02
10,067,760 B2 *  9/2018  Ryali ........................ G06F 8/20
(Continued)

OTHER PUBLICATIONS

"International Search Report and Written Opinion Issued in PCT Application No. PCT/US2019/012005", dated Mar. 21, 2019, 13 Pages.
(Continued)

*Primary Examiner* — Alan Chen
*Assistant Examiner* — Henry Trong Nguyen
(74) *Attorney, Agent, or Firm* — Chin IP, PLLC

(57) ABSTRACT

Because digital assistants tend to have different areas of expertise and/or different abilities to fulfill a given request, it is sometimes difficult for a user to know which digital assistant is best able to fulfill a request. Representative embodiments disclose mechanisms to increase federate digital assistants so that a user's request can be funneled to the digital assistant best able to fulfill the user's request. A meta-assistant gathers information on skills provided by a set of digital assistants. The meta-assistant also gathers completion data for requests for different digital assistants and user satisfaction information. A user submits a request to the meta-assistant. The meta-assistant extracts user intent from the request and redirects the user's request to the digital assistant best able to fulfill the request. Embodiments can utilize trained machine learning models or scored algorithmic approaches to select the digital assistant.

19 Claims, 7 Drawing Sheets

(56) References Cited

U.S. PATENT DOCUMENTS

| | | |
|---|---|---|
| 2010/0057675 A1 | 3/2010 | White et al. |
| 2012/0016678 A1* | 1/2012 | Gruber ..................... G06F 9/54 |
| | | 704/275 |
| 2014/0244712 A1 | 8/2014 | Walters et al. |
| 2016/0163311 A1* | 6/2016 | Crook .................. G10L 15/065 |
| | | 704/275 |
| 2017/0193349 A1* | 7/2017 | Jothilingam ........... G06Q 10/06 |
| 2017/0269975 A1 | 9/2017 | Wood et al. |

OTHER PUBLICATIONS

"Multiworld Testing Decision Service", Retrieved from<<http://mwtds.azurewebsites.net/>>, Retrieved on: Nov. 27, 2017, 3 Pages.

"First Examination Report Issued in Indian Patent Application No. 202047030300", dated Jun. 23, 2022, 6 Pages.

\* cited by examiner

FEDERATED INTELLIGENT ASSISTANCE

FIELD

This application relates generally to digital assistants. More specifically, this application relates to federating digital assistants.

BACKGROUND

There are many intelligent digital assistants in the market. Each of the assistants has its own strengths and certain assistants are better at certain tasks than others. Many assistants support the inclusion of both first-party and third-party skills in their skillset. A skill is something an assistant is able to do for the user such as answer a question, book an airline reservation, order an item, give directions, and so forth. The volume of skills makes it difficult for users to understand the capabilities of any given assistant, let alone all of the assistants a user may have access to.

It is within this context that the present embodiments arise.

DETAILED DESCRIPTION

Figure 1:
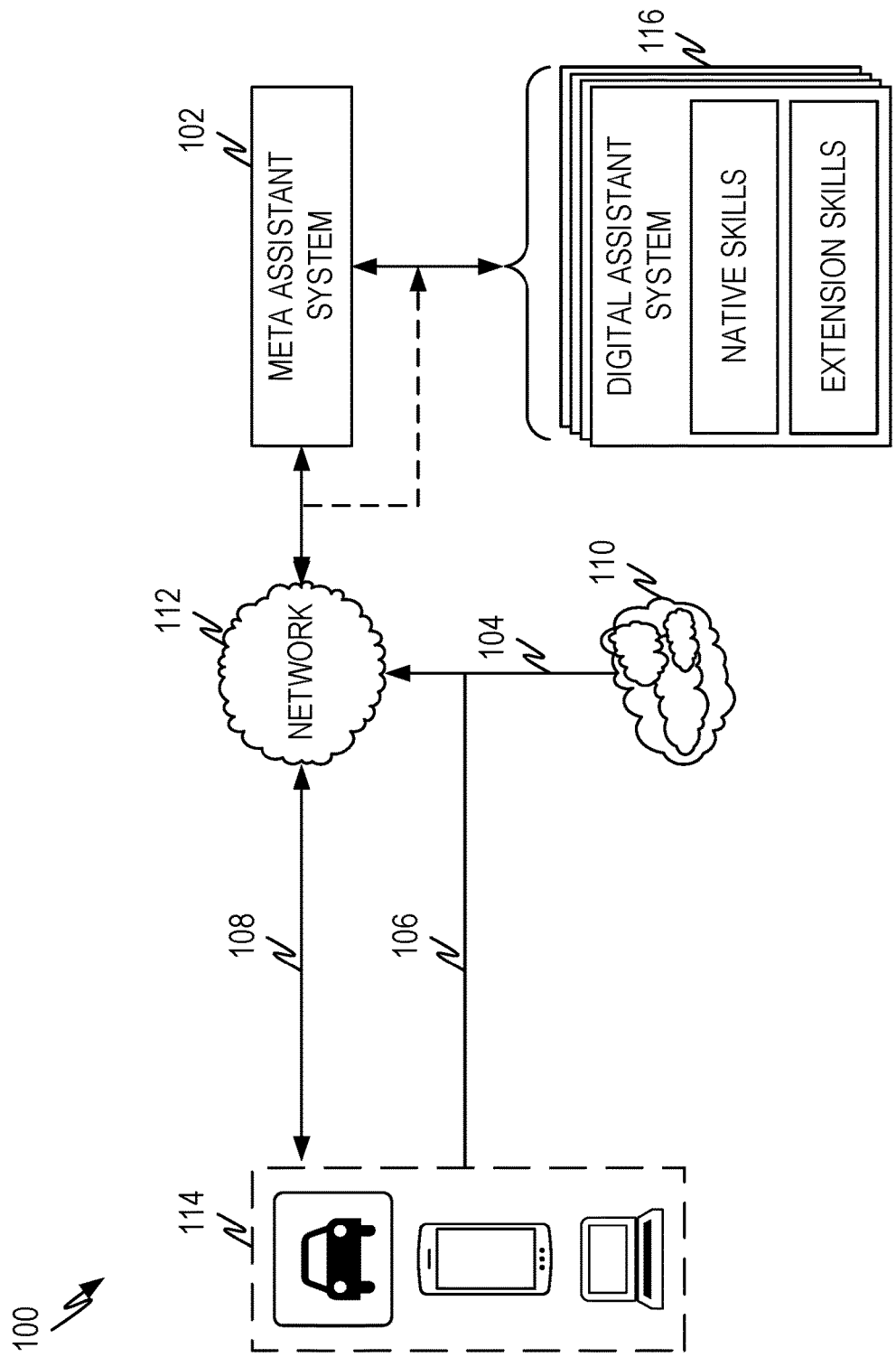
FIG. 1 illustrates a representative architecture showing federated digital assistants according to some aspects of the present disclosure.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

The following represent terms that will be used in this disclosure and is provided to help in understanding the disclosure.

A user submits a query and/or request to an embodiment of the disclosure. In this disclosure, these terms can be used interchangeably, and no distinction is intended. Thus, query or request represent input provided by a user. A query/request provided by the user can come in a variety of formats including speech, gesture, text, and so forth. When the input is provided in speech formation, the input is sometimes referred to as an utterance.

Intents are global properties of requests and/or proactive engagement scenarios. Intents signify the goal of the user or reason the digital assistant is engaged and vary across domains. An intent is sometimes referred to as a user intent. An intent maps to a skill the digital assistant will invoke in order accomplish something a user wants to do. The thing the user wants to accomplish is sometimes referred to as a task. In that sense a task is related to or described by an intent and is accomplished by invoking a skill in the digital assistant. A domain is a general area within which intents operate. Thus, when a user says, "how about Cleveland," as part of a conversation/dialog (a series of interactions with a digital assistant), the actual task the digital assistant performs (i.e., which skill is invoked) can vary depending on the domain. Thus, if a user has been requesting baseball team scores, the request can indicate an intent to retrieve the scores for the Cleveland Indians. If a user has been requesting weather data, the request can indicate an intent to retrieve the weather for Cleveland, Ohio. Thus, a domain can disambiguate a user's intent and/or help map an intent to a skill.

Digital assistants provided various services to a user that allow the user to fill the user's request (i.e., accomplish something on behalf of the user). The services provided by a digital assistant are often referred to as skills. Thus, skills represent the various tasks a digital assistant can accomplish on behalf of a user such as schedule a meeting, reserve a conference room, order an item from a merchant, book an airline reservation, and so forth. Skills can be native to a digital assistant (i.e., be built in by the digital assistant provider) or be added to the digital assistant (e.g., by a third party) through an extension mechanism provided by the digital assistant. Some digital assistants allow users and others to discover the available skills by requesting a list of things the digital assistant can do.

Context includes the interrelated conditions and/or data in which something exists. Thus, a request has a context that can include, for example, the time the request comes in, the application, device, and so forth used to make the request, the location of the user and/or device when the request was made, the location and/or existence of the request within a dialog, the state of a user device when a user makes a request, and any other such information. The context, like a domain, can help determine what the user is actually trying to accomplish.

Embodiments of the present disclosure include a meta-assistant that federates multiple digital assistants. The meta-assistant identifies the skills provided by each of the digital assistants to be federated and maps the skills into a common skills taxonomy. The meta-assistant collects information on completion of skills that are derived from user requests for various digital assistants. Explicit and/or implicit user feedback on how satisfied a user is with a digital assistant when fulfilling a request can also be gathered. Explicit and/or implicit user feedback on user preferences can be gathered to help the meta-assistant select an appropriate digital assistant. For example, the meta-assistant can identify whether a user prefers speed over accuracy or prefers one assistant over another if both provide a similar skill.

A user submits a query/request to the meta-assistant. The meta-assistant extracts the intent and optionally the domain of the user based on the query/request. The intent and/or domain are used in conjunction with the other information gathered and/or contextual information to select one or more digital assistants that are able to fill the user's request. The selection process can map the user intent to a skill of one or more digital assistants. Any final tradeoffs can be made using user preferences in some embodiments.

Once a set of appropriate digital assistants is identified, the meta-assistant can direct the user's request to a selected digital assistant in some embodiments. The meta-assistant can monitor a user's interactions with the digital assistant to gather completion information for the request. This completion information can be used to update the selection criteria for future requests. Completion information can also be used to derive implicit user preference information.

In an alternative embodiment, the meta-assistant can present a selection of digital assistants to the user along with an explanation as to why a particular digital assistant is on the list. The user can use the explanatory information to make a selection of one of the digital assistants and, in response, the meta-assistant can engage the selected digital assistant. As yet another alternative, the meta-assistant can allow the user to engage the desired digital assistant.

Description

A user can have access to numerous digital assistants provided by different companies/digital assistant providers. Because the expertise of the different digital assistant providers tends to vary, the skills built into different digital assistants can vary. Furthermore, certain digital assistants tend to be more accomplished at some tasks than others. Thus, one digital assistant may be better at interacting with productivity applications than another. Another digital assistant may be better at quick answers to questions, while yet another digital assistant may be better at order fulfillment.

Embodiments of the present disclosure include a mechanism to federate digital assistants in a manner that helps the user decide which digital assistant to engage for a particular task or engages the digital assistant best able to fill the user's request. The result is a system that takes advantage of the strengths of each of the federated digital assistants while eliminating or minimizing the weaknesses of the federated digital assistants in terms of task completion. Accordingly, the described mechanism may increase user interaction performance with digital assistants and overall user efficiency, among other benefits.

FIG. 1 illustrates a representative architecture 100 showing federated digital assistants 116 according to some aspects of the present disclosure. The purpose of FIG. 1 is to present mechanisms for how a digital assistant system 102 can operate within the context of various embodiments of the present disclosure. The discussion serves as a baseline for how a meta-assistant engages with a user as described more fully in below. Embodiments of the present disclosure can interact with a user in such a manner that the user can be unaware that she is engaging with the meta-assistant 102 rather than directly with a digital assistant 116.

In operation, the meta-assistant system 102 and/or digital assistant systems 116 use information from various data sources (104/106) and, in combination with a plurality of rules, identifies when an event, sequence of events, combined set of information, and/or so forth should cause the meta-assistant 102 to take one or more actions in accordance with the rules. Actions can include presenting information to a user (either by the meta-assistant 102 and/or by the digital assistant(s) 116). The information presented to a user is sometimes referred to as a "card" and can include information in any format such as text, audio, and so forth. Cards can include not only information but actions and/or options for a user to select. As a representative example, if a user asks the meta-assistant system 102 to book a reservation at a close restaurant for lunch for three people, the meta-assistant system 102 can select a digital assistant 116 to perform the task and engage the selected digital assistant 116. The selected digital assistant 116 may respond (either directly or via the meta-assistant 102) with a card that shows open reservation times at close restaurants and ask the user if she would like to book one of the reservations. Upon selecting one of the presented options, the selected digital assistant system 116 can book the indicated reservation. The sequence of exchange between a user, a meta-assistant 102 and/or a digital assistant 116 is referred to as a dialog or conversation. The number of steps (i.e., a card presented to a user and/or a response from a user) of a dialog before the task is completed and/or abandoned by the user can be used as a metric for how long it takes a user to complete a task with a digital assistant 116. In addition, the time between initiation of a task and completion and/or abandonment of the task can also be used as a metric for how long it takes a user to complete a task with the digital assistant 116. These time metrics are discussed in greater detail below.

The meta-assistant 102 and/or digital assistant systems 116 can be implemented on a system or on a plurality of systems such as those described below. Often all or part of the meta-assistant 102 and/or digital assistant(s) 116 is implemented in conjunction with one or more cloud architectures so that one or more cloud services are provided and utilized.

The data sources (i.e., 106, 104) can include user devices and/or systems 114 (hereinafter user devices 114). The user devices 114 can include personal devices such as a wearable device (e.g., watch, band, glasses, and so forth), a carry-able device (e.g., mobile phone, tablet, laptop, and so forth), a stationary or semi-stationary device (e.g., portable computer, desktop computer, hub, and so forth), and/or server devices and/or services (e.g., servers, cloud services, calendar systems, email systems, and so forth). The user devices 114 can also include devices that aren't typically considered to be user devices such as a vehicle, internet of things (IoT) device, and so forth. A user interacts with all of these devices and/or services and they all have information that can be used by the meta-assistant system 102 and/or the federated digital assistants 116 to provide digital assistant services to the user. This data will be collectively referred to as user data and/or context data and can include information related to the user as well as information about the user such as preferences, profile information and so forth. Example information includes, but is not limited to, a user's calendar and/or schedule, to do list, email history, purchase history, normal routine, route to work, home location, work location, school location (e.g., for a student), preferred forms of communication, devices owned/interacted with, and so forth.

Another source of information (104) can be information from the internet, third parties, and so forth. This is illustrated as 110 in FIG. 1. This information can be information about the user, information utilized by the digital assistant system 102, or any other relevant information. In this context, relevant means information that will be useful in providing services of the meta-assistant system 102 and/or digital assistant(s) 116. By way of example only, such information may include fulfillment information (information useful in fulfilling a service request by a user), information about a user's devices 114, information about the user not available from user devices 114, weather information, information about a user's location (close by business, points of interest, maps, and so forth), and/or other relevant information.

The user devices 114 and/or other sources of information 110 may be connected to the digital assistant system 102 via one or more networks 112. These can be any type of wired or wireless networks in any combination that allows the user devices 114 and the other sources of information 110 to connect to the digital assistant system 102 and/or vice versa.

The user devices 114 can serve not only as information sources, but also as information sinks for the meta-assistant system 102 and/or digital assistant(s) 116. For example, some or all of the services, systems, devices, etc. associated with a user can have functionality to interact with the meta-assistant system 102 and/or digital assistant(s) 116. As representative examples, user devices and/or systems 114 can execute a meta- and/or digital assistant client, web browser, messaging system, or other channel through which a user can interact with the digital assistant system 102 in either a proactive or reactive way. In the context of this disclosure, proactive means that the system takes action based on occurrence of an event, series of events, when a condition or combination of conditions are met, and so forth. Reactive means the system is responding, taking action, and so forth in response to the user reaching out to the digital assistant in some fashion like text, voice, gesture, eye tracking, and so forth.

As an example of a reactive operation for the meta-assistant system 102, a user may use a device to ask a question "what is on my schedule today?" In response, the meta-assistant can extract the user's intent(s) (e.g., to get a listing of the user's schedule) and identify which of the federated digital assistants 116 is best able to fill the user's request. Thus, in response to a request by a user, the meta-assistant 102 performs a two-step process. The first is to determine what the user wishes to accomplish and the second is to determine which digital assistant is best able to accomplish the user's intent.

Once the meta-assistant identifies the digital assistant(s) that can best fill the user's request, the meta-assistant can perform one of a number of tasks. In one embodiment the meta-assistant 102 selects the "best" digital assistant 116 and engages the digital assistant 116 to fulfill the user's request. In another embodiment, the meta-assistant 102 presents a card to the user that explains which digital assistant(s) 116 can best fill the user's request and allows the user to select an assistant to engage. The meta-assistant 102 can then directly engage the selected digital assistant 116 or can allow the user to directly engage a selected digital assistant. In either case, a selected digital assistant 116 fills the user's request and responds with a card including the user's scheduled events for the day. The user can ask the question via voice, input via a touch, gesture or text, or any other way. Furthermore, a request and response may use different devices. A user may ask the question, for example, using a client on a mobile device and the meta-assistant system 102 and/or selected digital assistant 116 can respond by displaying a card on a display in vehicle, on a wearable, or so forth. Thus, not only can the device vary from request to response but also the communication channel (i.e., mode of communication) can vary from request to response.

As an example of a proactive mode, the meta-assistant system 102 may know a vehicle's location, direction or route of travel, state of charge, and/or other information. The meta-assistant can determine that this is a situation where proactive engagement of a selected digital assistant 116 would benefit the user. For example, if the user passes the closest charging station by any significant distance, the vehicle will likely not have sufficient charge to make it to the next charging station.

This function can be accomplished in a variety of ways. In one embodiment, the meta-assistant 102 can utilize a set of rules to know when to engage a selected digital assistant. In another embodiment, the meta-assistant 102 can feed the monitored information to one or more digital assistants 116 and monitor the responses from the digital assistant(s) 116. If the situation causes one or more of the digital assistants 116 to initiate a proactive engagement with the user, the meta-assistant can "connect" the digital assistant to the user to allow the digital assistant(s) 116 to engage the user. If multiple digital assistants desire to engage with the user, the meta-assistant can select one through a selection process as described below.

Thus, for example, if the meta-assistant 102 passes information to the digital assistant(s) 116 and a digital assistant desires to interact with the user to inform them that if the user passes the closest charging station by any significant distance, the vehicle will likely not have sufficient charge to make it to the next charging station. The meta-assistant system 102 can engage the digital assistant 116. In response, the digital assistant 116 may select an appropriate channel to use to alert the user to the situation and ask if the user would like directions to the nearest charging station. For example, the digital assistant system 116 may decide to alert the user by initiating an action that mutes the radio, plays an alert sound, displays on a screen within the vehicle that the state of charge may not be sufficient to reach a more distant charging station and ask the user if they would like directions to the nearest charging station. Multiple devices can be involved, so if the user is talking on the phone, the alert sound may be played through the phone while a card may still be played on a screen in the vehicle.

The information received by the meta-assistant system 102 and/or digital assistants 116 may help the meta-assistant system 102 and/or digital assistants 116 decide where and how to provide a card to a user. The meta-assistant system 102 and/or digital assistants 116 can track the various devices and systems as well as the user's current context, such as what the user is currently doing, where the user is doing it, what devices are able to reach the user, and so forth, and based on the card and other factors select a particular channel for reaching the user. The various channels can be matched with the information the meta-assistant system 102 and/or digital assistants 116 has to transfer and an appropriate channel selected. For example, if a user has a watch, a phone, a laptop and a desk computer as possible channels to reach the user, and the user is in a meeting located in a conference room, the meta-assistant system 102 and/or digital assistants 116 would know that the user may not be likely to receive urgent tips sent to the laptop or desktop, but may be likely to receive tips via the watch or mobile phone. Given the context of the meeting, the meta-assistant system 102 and/or digital assistants 116 may determine that even for urgent tips, something providing an audible alert would not be welcome and thus chose to display text on the watch and vibrate the watch.

Channels can be selected based on rules, such as "if the user is in a meeting, do not send audible information," by probabilities/scores such as "a user is walking and likely to ignore information sent to a phone," or by any combination thereof, such as "a user is walking and is therefore likely to ignore information sent to a phone, thus, the importance of the information dictates that the alert be sent to the watch and that both an audible alert and vibration should be used."

Figure 2:
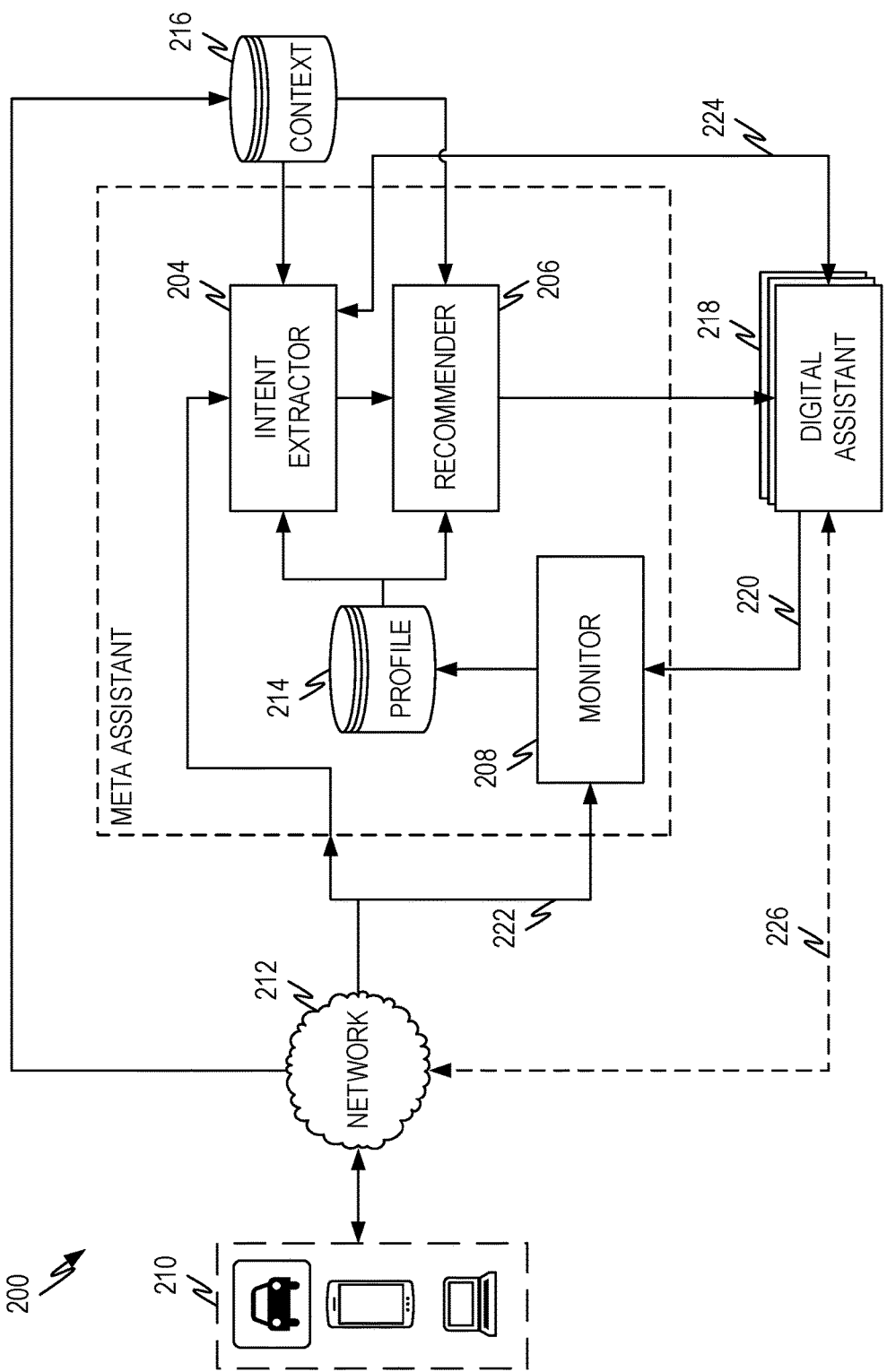
FIG. 2 illustrates a representative architecture of a federating meta-assistant according to some aspects of the present disclosure.

FIG. 2 illustrates a representative architecture 200 of a federating meta-assistant 202 according to some aspects of the present disclosure. The meta-assistant 202 can be, for example, the meta-assistant 102 of FIG. 1. As discussed in conjunction with FIG. 1, the meta-assistant 202 receives requests from a user via a user device 210, typically over a network 212. A received request triggers the reactive mode of operation previously discussed. Additionally or alternatively, the meta-assistant 202 can monitor information, such as context information 216 in order to identify proactive opportunities to engage a digital assistant on behalf of the user as previously discussed.

The context information 216 can comprise information gathered from user devices and/or systems that hold user information. Such information can include, but is not limited to, such information as a user's calendar and/or schedule, to do list, email history, purchase history, normal routine, route to work, home location, work location, school location (e.g., for a student), preferred forms of communication, devices owned/interacted with, and so forth (e.g., 106 of FIG. 1). The context information 216 can also comprise information gathered from other sources including information such as weather information, information about a user's location (close by business, points of interest, maps, and so forth), and/or other relevant information (e.g., 104 of FIG. 1). Context information 216 can include any information that the meta-assistant 202 and/or digital assistant(s) 218 would use to respond to a request and/or proactively engage a user as described herein.

As previously discussed, the meta-assistant 202 can engage proactively either by comparing context information to rules that identify an opportunity to proactively engage the user or by passing context information to one or more digital assistants 218 and identify when one or more of the digital assistants would proactively engage the user. This latter is indicated in FIG. 2 by 224, which shows passing information to and monitoring responses from one or more digital assistants 218 to identify opportunities to proactively engage the user.

When a request is received, or when rules and/or digital assistants indicate an opportunity to engage the user proactively (collectively referred to as proactive indicators), the intent extractor 204 evaluates the request and/or other information to extract one or more intents and/or domains from the information (i.e., request and/or proactive indicators). An example of intent extraction is discussed in conjunction with FIG. 4 below. The extracted intent(s) and/or domain(s) may be based on the context information 216 and/or the profile information 214.

The profile information 214 can comprise a variety of information. For example, the profile information 214 can comprise one or more of user profile information, parameters and/or information used to create a trained machine learning model (i.e., for use by the recommender 206 to select one or more digital assistants 218), metrics that are tracked for the digital assistants 218, ranking/scores for the digital assistants 218, a common taxonomy for skills for the digital assistants 218, and other information in any combination. Each of these are discussed briefly and then in more detail in conjunction with other description below.

The profile information 214 can also comprise user profile information that relates to the user and that is not otherwise represented in the context information 216. For example, such user profile information can comprise user preferences that influence the extraction of intent/domain and/or the selection of one or more digital assistants. Utilization of user profile information in intent extraction and/or digital assistant selection is discussed below.

The profile information 214 can comprise parameters and/or other information used to create a trained machine learning model for digital assistant selection (i.e., by the recommender 206). This process is discussed in greater detail below.

The profile information 214 can comprise metrics that are tracked for digital assistants 218 and that aid in selection of a digital assistant by the recommender 206. Two such metrics are the time metrics (e.g., the number of steps to task completion/abandonment or time to task completion/abandonment) discussed above. Other metrics are discussed below.

The profile information 214 can comprise ranking/scores for the digital assistants 218. As described in greater detail below, the skills provided by the digital assistants 218 can be ranked and/or scored to produce a skills-scoring/ranking matrix. The scores and/or rankings of a skill for a digital assistant can be based on information gathered explicitly and/or implicitly. Furthermore, the scores and/or rankings for a skill for a digital assistant can be based on objective data such as how long it takes a digital assistant to complete a task, the accuracy of the task and so forth as well as subjective data describing how the user experienced the digital assistant, such as whether the user felt the digital assistant adequately completed the task, whether the digital assistant was overly "chatty" or any other such subjective measure.

The profile information 214 can comprise a common taxonomy for skills for the different digital assistants 218. It is inevitable that a digital assistant provider will give names to their skills (or keywords that invoke skills) that are different from names given by other digital assistant providers. Thus, one digital assistant provider may label a skill that schedules something on a user's calendar a "scheduler" while another digital assistant provider may label a similar skill as a "calenderer." Thus, the skills of the different digital assistants 218 are mapped into a common taxonomy so that skills from different digital assistants that provide common functionality can be compared and ranked independent of what the skills are called by any particular digital assistant.

The profile information 214 can also comprise other information that is useful in selecting a digital assistant and/or extracting and intent/domain such as a dialog state, to the extent that is not represented in the context information 216.

Once the intent and/or domain are extracted, they are passed to the recommender 206. The recommender 206 selects one or more digital assistants 218 to engage to complete the request of the user and/or the proactive indicator(s). In the embodiment of FIG. 2, the system engages the selected digital assistant 218 on behalf of the user directly. How the digital assistant is engaged depends somewhat on how the digital assistant is monitored once the digital assistant is engaged. For example, if the digital assistant is set up to provide certain information back to the meta-assistant, the digital assistant can be engaged directly and turned over to the user so that the digital assistant can interact directly to the user as indicated by dashed line 226. In this embodiment, the digital assistant thus engaged will provide the information needed by the meta-assistant 202 directly to the meta-assistant 202.

In another embodiment, the meta-assistant 202 can act as a sort of man in the middle taking information from the selected digital assistant and passing that information to the user and, in turn, passing the input/responses by the user back to the digital assistant. In this way, the meta-assistant 202 can monitor interactions between the digital assistant and the user in order to collect metrics and other information used by the meta-assistant 202 as described in greater detail below.

The monitor 208 monitors information from the user, user devices, and/or digital assistants to gather at least some information that resides in the profile data 214. For example, the monitor 208 can gather metrics on the digital assistant(s) 218. For example, the monitor 208 can monitor interactions with the user and/or receive information directly from the digital assistant that indicates whether a request was completed or abandoned, the time it took to complete the request, the number of dialog steps to complete the request, the reason the request was abandoned (e.g., the user didn't answer a dialog to move the task to completion, the digital assistant was ultimately unable to complete the request), and so forth. The monitor 208 can also gather subjective feedback from a user such as by asking the user to rate their experience along one or more axes (e.g., the task completed but the user was unsatisfied with the answer/result, the task was not completed because it was taking too long, the user felt the digital assistant asked for too much information, it was difficult to complete the task using the digital assistant).

The monitor 208 can also gather information about which channel and/or device was used to communicate with the user and whether or not the user was satisfied with the channel and/or device.

The monitor 208 can be responsible for gathering user preference information such as which digital assistant a user prefers, either by asking the user directly or by watching and seeing which digital assistant is used most often by a user. Thus, the monitor 208 can collect and/or analyze historical use statistics and/or interact directly with the user. Such historical use statistics can be query independent and/or query dependent. For example, "digital assistant Y completed the task associated with query X Z percent of the time." Queries can also be gathered into larger categories such as by the intent and/or domain associated with a query. For example, "digital assistant Y completed the task associated with intent X Z percent of the time."

The historical use statistics can also be organized by user, cohort, or entire user population. In this context a cohort is a group of users that have similar user profiles. Similarity between user profiles can be made in one or more dimensions such as user demographic, geographic location, similar use profiles, and so forth. For example, "digital assistant Y completed user X's queries Z percent of the time." Where user X can be an individual user, a cohort, or the entire user population.

The historical use statistics can also be organized by user/cohort/population and by query. Other dimensions can also be used either alone, or in conjunction with user/cohort/population and/or query.

Thus, the monitor 208 is responsible for gathering and updating the information in profile 214 that is based on user interaction and/or feedback for the digital assistants 218.

Figure 3:
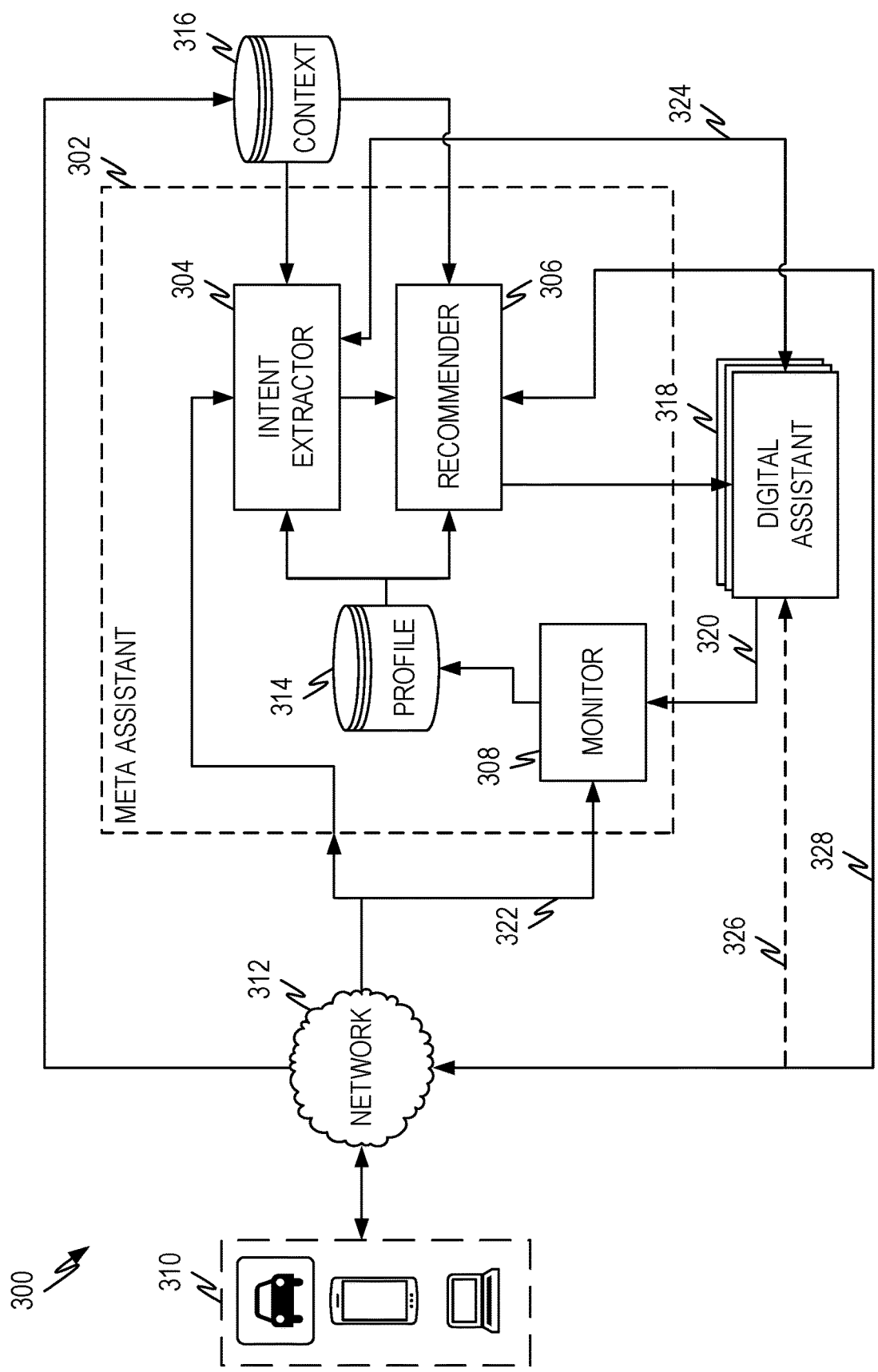
FIG. 3 illustrates a representative architecture of a federating meta-assistant according to some aspects of the present disclosure.

FIG. 3 illustrates a representative architecture 300 of a federating meta-assistant 302 according to some aspects of the present disclosure. The architecture of FIG. 3 works as explained above with the following additions. In this embodiment, the meta-assistant 302 can provide a list of recommended assistants either in a reactive or proactive operating mode. The reactive and proactive operating modes and all aspects except those set out here work exactly the same as explained in conjunction with FIG. 2 above. The numbering in FIG. 3 corresponds to the numbering in FIG. 2 mutatis mutandis for the change in the base figure number.

The recommender 306 works as described above with the added feature that in addition to engaging a selected digital assistant 318, the recommender 306 can assemble a list of recommended digital assistants that can fill the reactive or proactive intent along with information describing why they were included on the list. The meta-assistant 302 can provide the list directly to the user as indicated by 328. The user can directly engage a selected digital assistant 318 or the user can make a selection of a digital assistant 318 and the meta-assistant 302 can engage the selected digital assistant for the user.

When the user passes the selection to the meta-assistant 302, the meta-assistant 302 can engage the selected digital assistant as described in conjunction with FIG. 2 above. In this situation, the meta-assistant 302 can monitor both the selection and the performance of the selected digital assistant as previously described such as by collecting completion statistics/metrics.

Creating the recommendation list and associated reasoning information is described in greater detail below. In summary, the recommendation list contains a list of digital assistant(s) that are suitable to fulfill the user's request along with information that explains why the digital assistant is on the list. This allows a user to make an informed choice as to which of the listed digital assistant(s) she should select to complete the task.

Monitoring the selection gives the meta-assistant 302 information about user preferences that can be gathered implicitly. For example, if two digital assistants are listed and one is described in the associated information as accurate but slower and the other is described as less accurate but quicker, the selection may tell the meta-assistant 302 whether the user prefers accuracy over speed or vice versa, particularly when patterns in user selections become apparent over time (e.g., a user consistently sides with speed over accuracy).

Figure 4:
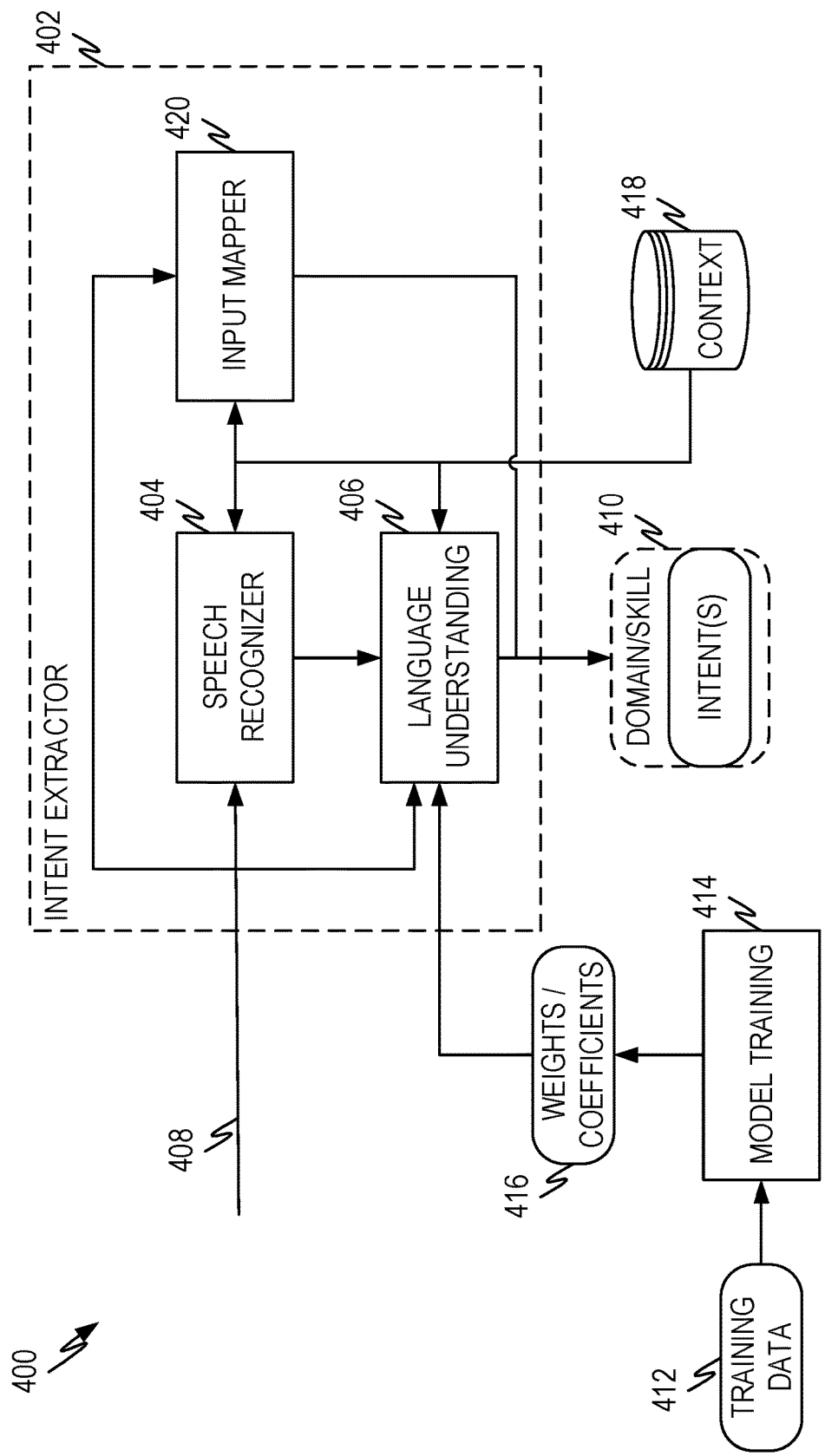
FIG. 4 illustrates a representative intent extractor according to some aspects of the present disclosure.

FIG. 4 illustrates a representative intent extractor 402 according to some aspects of the present disclosure. This intent extractor can be representative, for example, of intent extractor 204 and/or 304 discussed previously. The function of the intent extractor is to evaluate input comprising either a request or a set of circumstances that causes a digital assistant to desire to engage in a proactive manner and extract one or more intents and/or one or more associated domains. Numerous technologies exist to extract intent and/or domains from a request and/or other input. The representative intent extractor 402 is suitable for use in the embodiments of the present disclosure.

Input 408 can come in any format. Representative examples include speech, text, gesture, eye gaze, and so forth. As the input 408 is received by the intent extractor 402, the format of the input 408 can be converted into a common processing format, such as text. Thus, if the common format is text and if the input is speech, the speech can be recognized in a speech-to-text recognizer 404.

If the input is gesture, eye gaze selection, and/or other types of input then the context 418 of the gesture can be used to place the gesture input into an appropriate text format that can be processed to extract intent. The input mapper 420 can map the input into an appropriate text format in these embodiments. The input mapper 420 accomplishes the mapping interpreting the gesture, eye gaze, and so forth to identify the user input and then mapping what is input into an appropriate text representation that can be processed by language understanding model 406. The gesture, eye gaze, and/or other input and context gives sufficient information to allow the mapping to be accomplished. For example, if the input gesture 408 indicates agreement and the context is a card presented to a user asking if the user would like directions to a particular location, the gesture can be mapped to a text string asking for directions to that location. A set of text strings can be created that map to the set of gesture, eye gaze, and/or other input along with corresponding context information and stored in a data store (such as context 418).

Additionally or alternatively, such a mapping may bypass the language understanding model altogether to directly yield an intent(s) and/or domain(s) of the input. Returning to the example above, the gesture that indicates agreement to a card presented asking a user if the user would like directions can be mapped directly to the appropriate intent(s) and/or domain(s) without needing to go through the intermediate text representation. In this way, gestures, eye gaze, and other types of input can be mapped directly to intent(s) and/or domain(s), skipping the language processing operations. The gestures, eye gaze, and/or other types of input along with associated context information can be associated with corresponding intent(s)/domain(s) so that the corresponding intent(s)/domain(s) can be found by searching on the gesture/eye gaze/other input and associated context information. For example, the information can be placed in a data store or other searchable storage facility that allows the intent(s)/domain(s) to be retrieved given the input and context.

Speech input can be processed by first converting the speech to textual input as illustrated by speech recognizer 404. Many methods exist to accomplish speech to text conversion and any of these methods can be used in embodiments of the present disclosure.

Once the speech input has been converted to text by speech recognizer 404, the resultant text as well as textual input and other input that is translated into a common textual format can be processed by language understanding model 406 to obtain the related intent(s) and/or domain(s). Language understanding model 406 can comprise a trained machine learning model. The machine learning model can comprise one or more of a recurrent neural network (RNN) such as a Long Short-term Memory (LSTM) model a Gated Recurrent Unit (GRU), a convolutional neural network (CNN), a support vector machine (SVM) either alone or coupled with a hidden Markov model (HMM), or other machine learning model, either alone or in any combination.

The language understanding model 406 can be trained using training data 412 and a training process 414 to produce weights and/or coefficients 416 that are utilized in the model. Each of the machine learning models have training protocols that are understood and tailored to the particular machine learning model. Thus, those of skill in the art will understand how to train the selected machine learning model to accomplish the language processing that yields the intent(s) and/or domain(s) associated with textual input.

The extracted intent(s) and/or domain(s) can be dependent upon previous input (e.g., where the current input is part of a dialog), thus the context information 418 can comprise previous input, previous steps in a dialog, previously extracted intent(s) and/or domain(s) and so forth. These can be processed as part of the language understanding process 406 and/or input mapper 420 to increase accuracy of the intent(s) and/or domain(s) associated with the current input 408.

Once the intent extractor 402 produces the intent(s)/domain(s) 410 from the input 408, the intent, context, profile, and other information is passed to a recommender, such as recommender 206 and/or 306.

Figure 5:
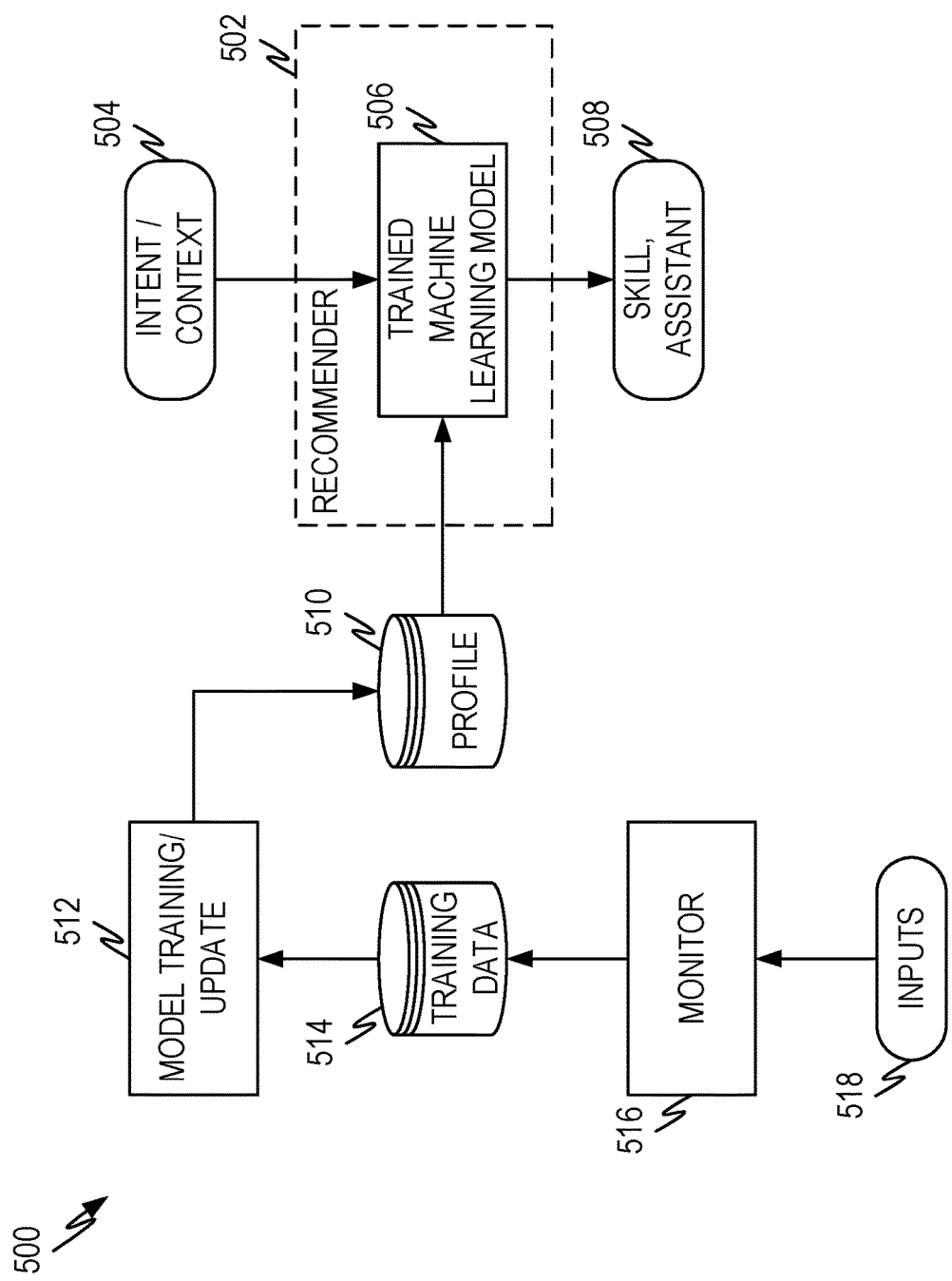
FIG. 5 illustrates representative recommender according to some aspects of the present disclosure.

FIG. 5 illustrates representative recommender 502 according to some aspects of the present disclosure. FIG. 5 also illustrates a training process for the trained machine learning model 506 that is part of the representative recommender 502.

The purpose of the recommender 502 is to take available information and produce a top or top few digital assistants that can best complete the task associated with a request or associated with a proactive engagement. In this context, "best" means to complete the task to the user's satisfaction. Thus, the recommender 502 selects those digital assistants that have the highest likelihood of satisfying user expectations.

User expectations have both an objective portion and a subjective portion. Objectively, a user expects a digital assistant to understand what the user wants and to accurately and completely complete the task. Subjectively, the user expects a digital assistant to complete the task in a "frictionless" manner. Frictionless in this context means to complete a task without interacting with the user in a way that the user finds unsatisfactory. In other words, sometimes it is not sufficient to produce a correct answer in order to satisfy a user. The user experience must also meet user expectations. Thus, a digital assistant that takes too many steps, takes too long, asks too many clarifying questions, presents information in a manner that a user considers annoying or confusing, or otherwise doesn't meet a user's expectations may not be the best digital assistant for that task for that user. This is because even if the task is accurately completed, the process of completion was unsatisfying to a user.

To meet both the objective and subjective expectations of the user, the trained machine learning model can take into account both objective and subjective measures. Objective measures can comprise one or more of:

1. A completion measure indicating whether or not the request was complete;
2. An accuracy measure of whether the request was accurately completed;
3. A time to completion measure of how long (either in time and/or steps of a dialog) the digital assistant took to complete the request (for requests that were completed);
4. A time to abandonment measure of how long (either in time and/or steps of a dialog) the digital assistant took before a user abandoned the request (for requests that were not completed);
5. A sufficiency measure of how often (or how much) the digital assistant had to go back to the user for clarifying or additional information (such as how many steps in the dialog requested additional information);

6. A repeated use measure indicating how often and/or whether a user used the same digital assistant to complete a request previously completed; and/or 7. Other objective measures.

Subjective measures can comprise one or more of:

1. A satisfaction completion rating indicating how satisfied a user is with the completion of a request;
2. A digital assistant satisfaction rating indicating how satisfied a user is with a given digital assistant; and/or
3. Other subjective measures.

The objective and/or subjective measures can be gathered on a per user basis, a per query basis, or both at different levels of specificity and aggregated along one or more of the dimensions. For example, users can be associated with larger groups of users. Thus, a given user may be a member of one or more cohorts, which are groups of users that share one or more common similarities such as geographic, demographic, economic, use profile, and/or other similarities. A user is also a member of the entire user population. Similarly, user groups can be selected on any basis to include and/or exclude any user(s). Thus, the objective and/or subjective measures can be gathered and/or aggregated on a per user basis, per cohort basis, a per user group basis, a user population basis, and so forth. Similarly, queries are part of different levels of specificity. A query is associated with an intent and an intent has an associated domain. Domains can be part of higher level domains. For example, a user may want to add something to their calendar. The query to accomplish this is associated with an intent (add an item) and a domain (calendar). The domain (calendar) can be part of a higher level domain (productivity applications), a group of selected intents (intent group), or a group of selected domains (domain group). Thus, the objective and/or subjective measures can be gathered and/or aggregated on a per query, per intent, per intent group, per domain, per domain group, per higher level domain basis, and so forth.

Gathering and/or aggregating metrics along user, query and/or other dimensions allows the recommender to model and/or understand such information as:

1. Digital assistant X has been able to fulfill similar queries a user has submitted Y % of the time;
2. Digital assistant X has been able to fulfill queries in domain Y for all users Z % of the time;
3. Users in cohort X that use digital assistant Y to try to complete queries associated with intent Z abandon the attempt after 3 minutes on average;
4. X % of users are somewhat satisfied with digital assistant Y when attempting to order pizza.

Those of skill in the art will understand based on this disclosure that numerous other such statements can be made based on the information gathered (objective and/or subjective) and aggregated along one or more dimensions. Although the above described gathering and/or aggregating objective and/or subjective measures along the user and/or query dimensions, other dimensions can also be used.

As the objective and/or subjective measures are gathered and/or aggregated along different dimensions (query, user, etc.), the recommender begins to assemble a model of what different digital assistants are good at. Thus, one digital assistant may be good at quick answers to questions, another good at interacting with productivity applications, another with order fulfillment, and so forth. This picture becomes apparent as metrics are gathered over time.

The data gathered can be weighted so that more recent data is given more weight in a calculation than older data. When any aggregation takes place along an axis, the aggregation of data is a weighted aggregation (e.g., weighted sum, weighted average, weighted percentage, and so forth). Thus, as digital assistants evolve over time and add or upgrade skills, the gathered data can be more reflective of the current abilities of the digital assistant. When an aggregation (statistic, sum, average, etc.) is calculated, the weight applied to individual data points can be inversely proportional to the time since the statistic has been gathered. Thus, more recent data points are given more weight than older data points. Additionally, or alternatively, the data can be windowed so that data older than a given time is not part of the aggregation. Windowing can also be conditional on there being sufficient recent data to form a suitable aggregation. In other words, the most recent N data points are included in the aggregation independent of how old they are.

The exact weighting scheme and/or windowing scheme can be determined empirically by comparing objective and/or subjective measures to the predictions (e.g., aggregations) made by the recommender. For example, when statistics are gathered on a per user basis, the recommender can predict how likely a given user is to be satisfied with a particular digital assistant accomplishing a given task. When different size windows and/or weights are applied to the data, the likelihood will often change. The weights and/or windows can be adjusted to give a best fit prediction measure (least squares, etc.) for a user, group of users, and so forth. Similar analysis can be performed for other dimensions or multiple dimensions simultaneously.

Objective and subjective measures can be gathered by the meta-assistant in both an implicit and explicit manner. Explicit collection relies on direct user input, such as asking a user a series of questions when setting up an initial user profile. Questions can include things like: "Which digital assistant do you prefer to do X?"; "Rank the following factors in order of importance: accuracy, speed, completeness, . . . "; and so forth. Implicit collection relies on the information collected by monitor (such as 208, 308, 516) to see how a user actually uses a digital assistant, see how a digital assistant actually performs, and so forth. Thus, implicit and/or explicit data can help identify such information as which digital assistant the user prefers (e.g., digital assistant X, digital assistant X to handle query of type Z, digital assistant Y over digital assistant X), a relative indication of whether the user prefers one digital assistant attribute over another (e.g., speed over accuracy, completeness over speed) and/or an indication of a digital assistant attribute the user prefers (e.g., digital assistant X when communicating by voice, user interface of digital assistant Y).

Implicit data collection can also trigger an explicit data collection event. For example, when a user creates a profile they indicate a preference for digital assistant X. However, in looking at which digital assistants a user actually engages, the statistics show a preference for digital assistant Y. The meta-assistant can present a card to the user to ask the user whether the user prefers digital assistant Y over X.

The objective and/or subjective data collected can be used to train and/or update the trained machine learning model 506. The inputs 518 correspond to at least a portion of the objective and/or subjective data discussed above. The inputs 518 are collected by a monitor 516 and some or all of the collected data can be used to assemble a set of training data 514. The training data 514 can be used by a model training and/or update process 512 to produce coefficients, weights and/or other parameters that are part of the trained machine learning model 506. These can be stored in a data store, such as profile store 510 and retrieved by the trained machine learning model 506 or other process in recommender 502 so that the correct trained machine learning model 506 is used for the input intent, context, and/or domain 504.

The trained machine learning model can be conducted along any of the dimensions previously discussed. Thus, in some embodiments, the trained machine learning model may be configured on a per user basis, a per cohort bases, a user population basis, a per query basis, a per intent basis, a per domain basis, or any other dimension in any combination. Thus, the recommender can reconfigure the trained machine learning model 506 so that the trained machine learning model 506 is appropriate for the desired dimension(s) at the desired level of aggregation(s).

Although not shown in FIG. 5, in lieu of, or in addition to, trained machine learning model 506, a rules based approach can be taken. Thus, intent(s), context(s) and/or domain(s) 504 can be processed in light of rules to select one or more digital assistants. The rules can be a single selection criteria such as "when the intent domain is ecommerce, select digital assistant X" or "when the intent is to add an item to a calendar select digital assistant Y." The rules can relying on combinatorial logic of conditions involving intent, domain, context, user and/or combinations thereof, aggregated as described herein in any dimension or combination of dimensions. For example, "select digital assistant Z if the user's calendar is associated with productivity application P1 and the user is interfacing through a mobile device and the intent is to add an item to a calendar or the user is in cohort W."

The output of the recommender is one or more of:
1. A digital assistant to be invoked;
2. A skill that the digital assistant can invoke to fulfill the request;
3. Data needed to invoke the skill;
4. An intent, domain, and or other information;
5. Relevant contextual information;
6. A list of digital assistants that can be used to fill the request and/or proactive indicator;
7. Reasons why the digital assistants on the list were chosen, such as an explanatory statistic like those discussed above (e.g., X % of users preferred this digital assistant when submitting a similar query); and/or
8. Other information.

Several different types of machine learning models are suitable for use in this context, but supervised and unsupervised models are suitable. While the number of algorithms being developed and that are suitable are constantly expanding, some representative types of models that may be suitable include: Baysian type models including native Bayes, Bayesian belief networks, Bayesian networks; chi-squared automatic interaction detection, conditional decision trees, and so forth; dimensionality reduction models including principal component analysis, multidimensional scaling, principal component regression, and so forth; clustering techniques such as k-means; hierarchical clustering, expectation maximization, support vector machines, and so forth; deep learning models such as convolutional neural networks, deep Boltzmann machines, and so forth; neural networks such as recurrent neural networks, long short term memory networks, and so forth; rule based systems; regression models such as linear regression, ordinary least squares regression, logistic regression and so forth; as well as many other types of machine learning models.

Figure 6:
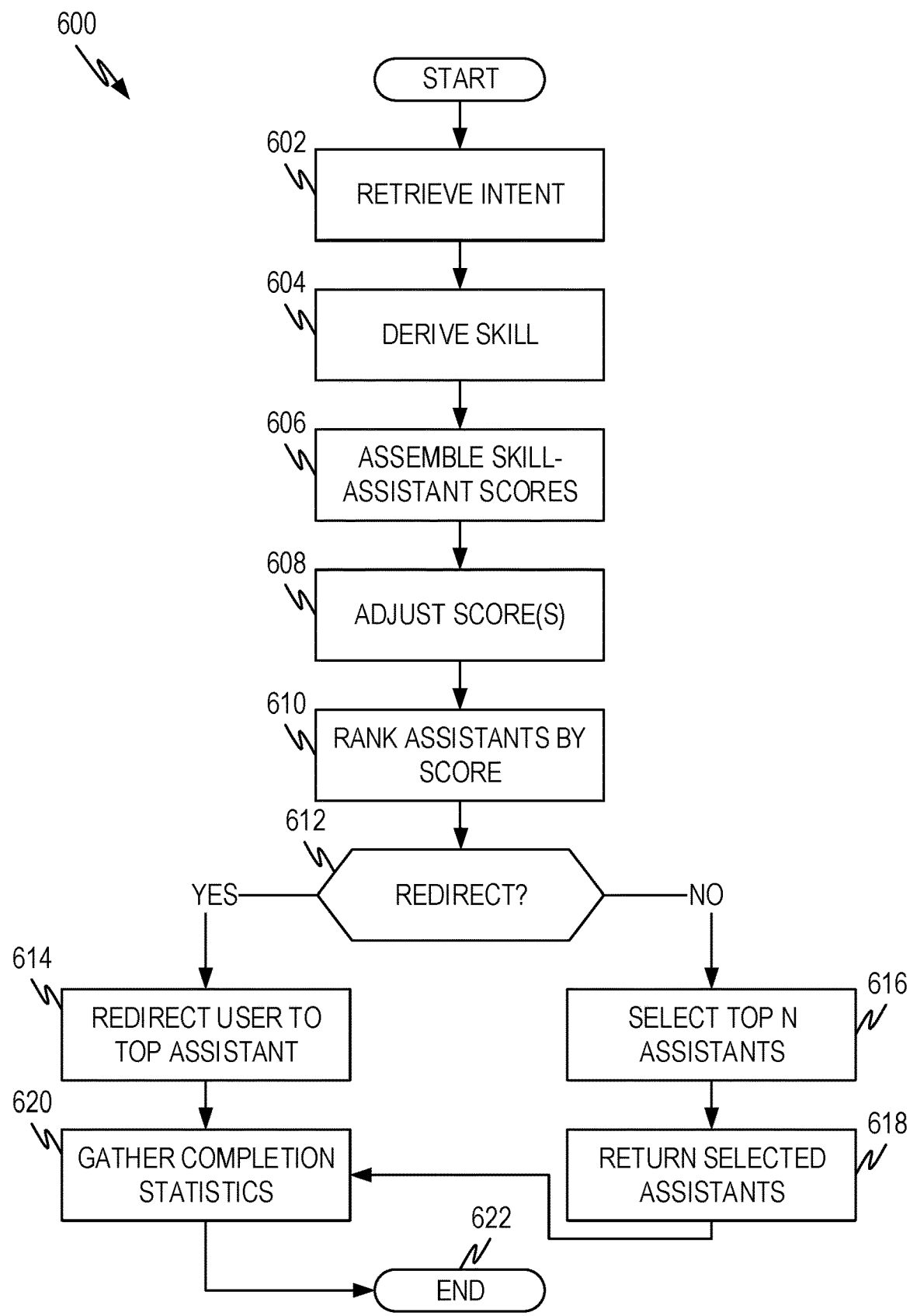
FIG. 6 illustrates a representative flow diagram for a recommender according to some aspects of the present disclosure.

FIG. 6 illustrates a representative flow diagram 600 for a recommender according to some aspects of the present disclosure. Such a recommender can be an algorithmic recommender rather than a recommender that utilizes a trained machine learning model as indicated in FIG. 5.

Additionally, or alternatively, a trained machine learning model can be used to perform one or more of the operations in the flow diagram such as deriving a skill from an intent, creating ratings, adjusting ratings, and so forth as described in greater detail below. For example, machine learning model(s) such as those described above can be trained with appropriate data to perform any or all of the operations. The appropriate data can be selected so that the model(s) are trained on a per user basis, a per cohort basis, a user population basis, a per intent basis, a per intent group basis, a per domain basis, a per domain group basis, a per query basis and/or combinations thereof. As noted by these examples, the training data can be aggregated along any dimensions at any level of aggregation. The training data can be selected as described herein on an implicit and/or explicit basis and can comprise any or all of the data examples described herein. Given the data examples described herein, those of skill in the art will understand how to select training data for a given digital assistant.

In operation 602 the intent(s) and/or domain(s) is received from the intent extractor. Operation 604 utilizes a combination of the intent(s), domain(s), and/or relevant context information (not shown) to identify one or more skills that can be invoked to perform one or more tasks to effectuate the intent(s). There are various ways this can be accomplished. In one embodiment, intent(s), domain(s) and/or relevant contextual information in appropriate combinations can be associated with skills of the skill taxonomy previously described so that the combination can be used to search the taxonomy.

For example, in assembling the taxonomy, the system can identify the skills that each digital assistant provides. For purposes of illustration, consider three digital assistants DA1, DA2, and DA3. DA1 provides skills A, B, C. DA2 provides skills D and E. DA3 provides skills F and G. These can be collected in an offline process either through an enumeration process which asks each digital assistant the skills it provides or by collecting information from the digital assistant provider on which skills are available for their provided digital assistant. As noted above, skills are invoked to effectuate an intent and perform a task. Thus, the task that skills perform can be mapped to an intent which provides the mapping between a skill and an intent. In this mapping the intent is the intent that is identified by the intent extractor of the meta-assistant.

The intent derived by the meta-assistant need not be the same (e.g., have the same name and/or domain) as the intent that is identified by a particular digital assistant if the input that created the intent in the meta-assistant is given to the digital assistant. In other words, the intent of the meta-assistant may have a different name and/or domain than the intent internal to the digital assistant. In effect, the meta-assistant derived intent/domain combination can be a different name for the same digital assistant derived intent/domain.

Returning to the example, the offline process collects the skills from each of the digital assistants:
1. DA1: A, B, C
2. DA2: D, E
3. DA3: F, G The skills map to tasks to effectuate an intent. The skill taxonomy of the meta-assistant also map to tasks to effectuate an intent. Thus, the skills from the individual digital assistants can be mapped to skills in the taxonomy through common tasks and/or intents. For example, if skill A "adds an item to a user's schedule" and a skill in the meta-assistant skill taxonomy effectuates the same thing, then skill A can be properly placed in the taxonomy. Similarly, if skill D "creates an appointment on a calendar" it can be mapped to the same skill in the taxonomy. Thus, the collected skills of the digital assistants can be mapped to skills in the taxonomy. In this example, suppose that the skills of the digital assistants map to the following skills:

S1: A, D;
S2: B;
S3: C, G; and
S4: E, F.

Similarly, the skills in the taxonomy have associated intents:

S1: I1;
S2: I2;
S3: I3; and
S4: I4.

Although a 1:1 skills to intent mapping is shown in this example, multiple skills can be mapped to a single intent and/or multiple intents can be mapped to a single skill in some embodiments. Similarly, as noted above, domain(s) and/or contextual information can be mapped to a skill in addition to or in lieu of the intent. Thus, in some embodiments a intent, domain, context, and/or a combination thereof identifies a skill in the taxonomy.

Returning to operation 604, the skill can be derived by looking up the skill associated with the intent, domain, and/or context, either alone or in any combination.

Once the skill has been derived from the intent, domain and/or context, operation 606 assembles the skill-assistant ratings. Returning to the example above, the mapping of skills into the taxonomy shows that:

1. digital assistant DA1 implements skills S1, S2 and S3;
2. digital assistant DA2 implements skills S1 and S4; and
3. digital assistant DA3 implements skills S3 and S4.

Thus, if operation 604 derives skill S3, then the possible candidates to utilize to effectuate the user's intent are DA1 and DA3. Through the collection of objective and subjective data as described above, scores for DA1 and DA3 with regard to implementing skill S3 can be obtained. One method to implement scores is through a trained machine learning model. The obtained data can be used to train a model as described above that produces scores on a given range like [0, 1] or [0, 100]. Again the machine learning model can be trained on a per user, per query basis or can be trained to be independent of a user and/or query and/or any other dimension. The various types of machine learning models described above can also be used in this operation.

Additionally, or alternatively, aggregation functions can be used to produce scores associated with skills. The process to accomplish this is to assign a numeric range for the various data metrics that are collected. For metrics that have an associated numeric value, such as the time and/or step metrics, the time and/or steps can be assigned to a value range like [0, 1] or [0, 100]. Value ranges can also be assigned to subjective data so that a user that gives a digital assistant a five-star rating can be assigned at the high end of the range, a zero-star rating at the low end and the others spaced out in the range. Other know methods to assign metrics to data ranges can also be used.

Once all the values for a given skill and a given digital assistant have been assigned values in the appropriate data ranges, the assigned values can be aggregated such as by a normalized weighted average. Those metrics that are more important, based on more recent data, and/or other factors can be given a higher weighting than others. The normalized weighted average can then be the overall score for that skill for that digital assistant. As previously discussed, the skill-assistant scores can be calculated on various dimensions such as user and/or query at various levels of aggregation in some embodiments. Thus, on the one end, scores can be particular to a query and/or user. On the other end, scores can be independent of any user and/or query.

Continuing on with the above example, DA1 may have an S3 score of 0.8 and DA3 may have an S3 score of 0.4.

Once the skill-assistant scores have been obtained in operation 606, the scores can be adjusted in operation 608 by factors not already accounted for, in some embodiments. For example, if a user prefers to us DA3 for all their queries, then when DA3 appears on the list the score for DA3 can be adjusted upward by some amount. Similarly, user preferences that indicate a dislike for a particular digital assistant can have their scores lowered. The values for score adjustments can be derived from a relative ranking a user gives digital assistants. Thus, the meta-assistant can gather information on subjectively how much a user (or cohort or population) likes one assistant over another and assign adjustment values that are proportional to the subjective differences. In some embodiments, adjustments can be made only when there is a tie between two digital assistant scores. In other embodiments, adjustments are not made and operation 608 is not performed.

Operation 610 ranks the list of assistants by the resultant scores. Operation 610 can also assemble statistics that describe the digital assistant on the list. These can be presented to a user in some embodiments as described below as to "why" the digital assistant appears on the list and advantages/disadvantages over other assistants on the list. The assembled statics can be those that are described above, such as the following representative examples:

1. Digital assistant X has been able to fulfill similar queries a user has submitted Y % of the time;
2. Digital assistant X has been able to fulfill queries in domain Y for all users Z % of the time;
3. Users in cohort X that use digital assistant Y to try to complete queries associated with intent Z abandon the attempt after 3 minutes on average; and
4. X % of users are somewhat satisfied with digital assistant Y when attempting to order pizza.

Operation 612 identifies whether the meta-assistant will select a digital assistant and directly engage the digital assistant on behalf of the user or whether the meta-assistant will present a list of choices to the user and allow the user to select an assistant. If the meta-assistant is configured to engage the user for the particular situation presented, then the "YES" path is taken to operation 614. Otherwise, the "NO" path is taken to operation 616.

Operation 614 selects the highest ranking digital assistant on the list and engages the digital assistant to fill the request or respond to the proactive indicators. In the example above, digital assistant DA1 would be selected on the basis of the higher S3 score. As the digital assistant operates, operation 620 gathers desired information as previously described in conjunction with the monitors of the meta-assistants.

Operation 616 selects the top N assistants and the assembled statistics are presented to the user for the user to select a desired assistant. The top N assistants can be selected using one or more strategies. In one embodiment, N is a fixed number such as the number of assistants that can easily be presented on a card to the user. In another embodiment, N changes based on the channel and/or device, thus more assistants may be presented via a channel and/or device that allows the user to easily absorb the information while a small screen and/or channel will reduce the number presented. In yet another embodiment, the meta-assistant presents all assistants with a score above a particular threshold, such as 0.6 (assuming scores are normalized on a [0,1] interval). In yet another embodiment, multiple criteria are utilized such as the top N that are above a threshold score.

Operation 618 presents the list of assistants and/or the associated descriptive information such as the statistical information described above. The user can then select a desired assistant and pass the selection back to the meta-assistant so the meta-assistant can engage the selected assistant and gather data (operation 620) as previously described.

The method ends at operation 622.

Example Machine Architecture and Machine-Readable Medium

Figure 7:
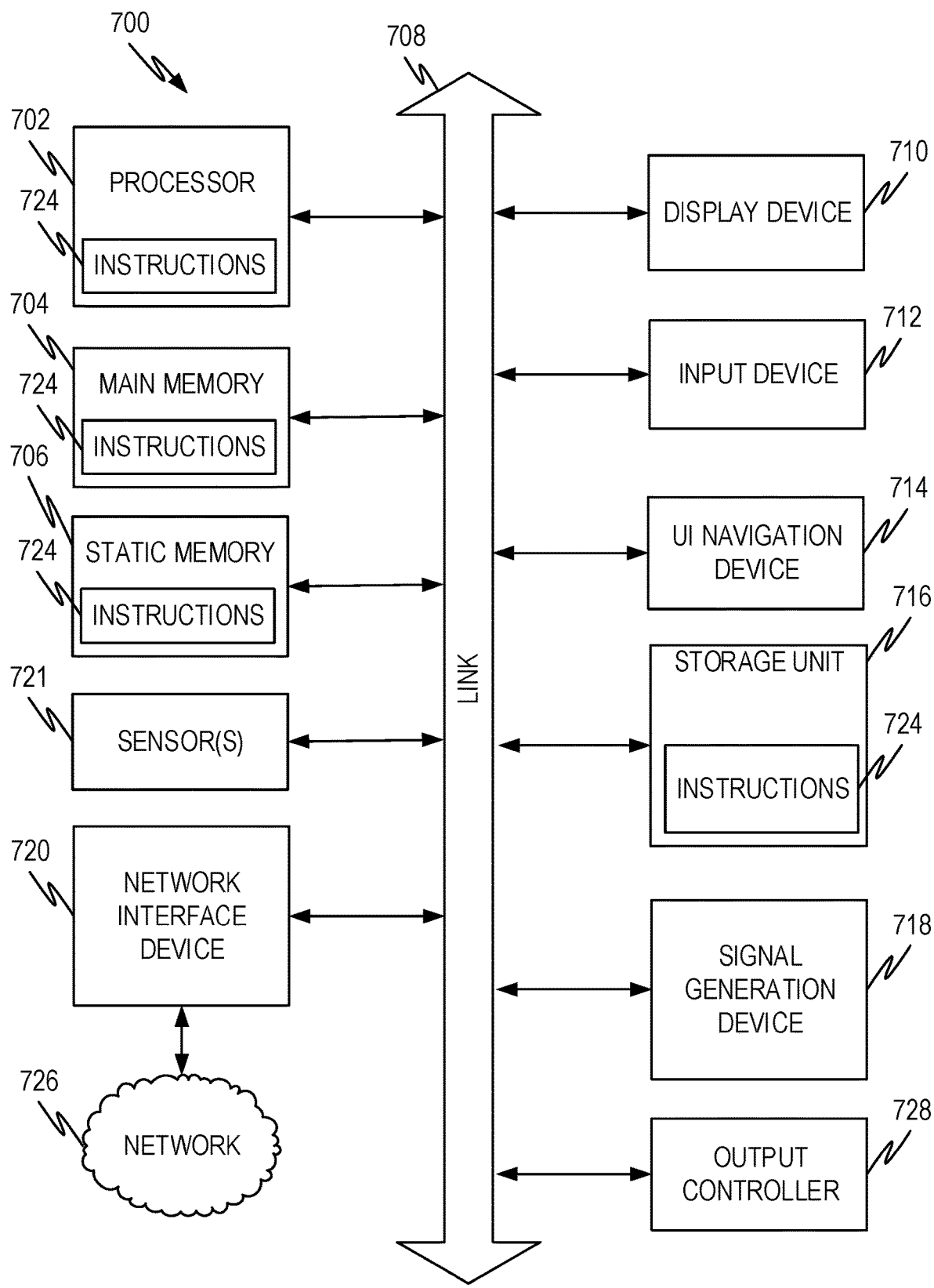
FIG. 7 illustrates a representative machine architecture suitable for implementing the systems and other aspects disclosed herein or for executing the methods disclosed herein.

FIG. 7 illustrates a representative machine architecture suitable for implementing the systems and other aspects disclosed herein or for executing the methods disclosed herein. The machine of FIG. 7 is shown as a standalone device (such as the mobile devices described herein), which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 7 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 700 includes at least one processor 702 (e.g., a central processing unit (CPU), a graphics processing unit (GPU), advanced processing unit (APU), or combinations thereof), one or more memories such as a main memory 704, a static memory 706, or other types of memory, which communicate with each other via link 708. Link 708 may be a bus or other type of connection channel. The machine 700 may include further optional aspects such as a graphics display unit 710 comprising any type of display. The machine 700 may also include other optional aspects such as an alphanumeric input device 712 (e.g., a keyboard, touch screen, and so forth), a user interface (UI) navigation device 714 (e.g., a mouse, trackball, touch device, and so forth), a storage unit 716 (e.g., disk drive or other storage device(s)), a signal generation device 718 (e.g., a speaker), sensor(s) 721 (e.g., global positioning sensor, accelerometer(s), microphone(s), camera(s), an eye tracking subsystem, and so forth), output controller 728 (e.g., wired or wireless connection to connect and/or communicate with one or more other devices such as a universal serial bus (USB), near field communication (NFC), infrared (IR), serial/parallel bus, etc.), and a network interface device 720 (e.g., wired and/or wireless) to connect to and/or communicate over one or more networks 726.

Rather than the more conventional microprocessor, Neural Network chips can be used to implement embodiments of the present disclosure. Neural Network chips are specialized chips designed to execute various forms of neural networks. As such, they are suitable for use in implementing aspects of the present disclosure such as the source separators 710 and other neural network aspects of the present disclosure. Based on the disclosure contained herein, those of skill in the art will know how to implement the embodiments of the present disclosure using one or more neural network chips.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A computer implemented method, comprising:
receiving a request from a user intended to be filled by a digital assistant;

extracting a user intent from the request;

identifying at least one digital assistant capable of fulfilling the quest from among a plurality of digital assistants, comprising one or more of:

submitting the user intent to a trained machine learning model being trained on a set of data gathered from the plurality of digital assistants and a plurality of users; and utilizing a set of rules to select a digital assistant based on the intent; and responsive to identifying the at least one digital assistant, taking an action to effectuate the user intent, the action comprising engaging a digital assistant from among the at least one digital assistant utilizing the request or presenting the at least one digital assistant to the user along with explanatory information.

Example 2

The method of example 1 wherein the action comprises presenting the at least one digital assistant to the user along with explanatory information.

Example 3

The method of example 2 further comprising:

receiving a selection from the user indicating one of the at least one digital assistants that should be engaged; and engaging the selected digital assistant utilizing the request.

Example 4

The method of example 1 wherein the action comprises engaging a digital assistant from among the at least one digital assistant.

Example 5

The method of example 1 further comprising collecting completion data comprising one or more of:

an indication of whether or not the request was completed;

a time measure of how long the request took until completion or abandonment; and a dialog step measure of how many steps in a dialog until completion or abandonment.

Example 6

The method of example 1 further comprising collecting explicit or implicit user information comprising one or more of:

which digital assistant the user prefers;

a relative indication of whether the user prefers one digital assistant attribute over another; and an indication of a digital assistant attribute the user prefers.

Example 7

The method of example 1 further comprising enumerating skills implemented by the plurality of digital assistants and mapping the enumerated skills into a taxonomy used to describe all enumerated skills.

Example 8

The method of example 1 wherein the set of data used to train the trained machine learning model comprises a plurality of:

a request received from a user;

an intent derived from the request;

a domain associated with the intent;

whether or not the request was completed;

skills implemented by a digital assistant;

percentage representing a number of times the request was successfully completed by the digital assistant;

user feedback indicating a preference for the digital assistant;

user feedback indicating a preference for a characteristic of the digital assistant;

a time measure indicating how long the request took to completion or abandonment; and a step measure indicating how many steps in a dialog were performed before completion or abandonment.

Example 9

The method of example 8 wherein at least some the set of data used to train the trained machine learning model is aggregated on one or more of:

a per user basis;

a per cohort basis;

a user population basis;

a per intent basis;

a per intent group basis;

a per domain basis;

a per domain group basis; and a per query basis.

Example 10

A system comprising:

a processor and device-storage media having executable instructions which, when executed by the processor, cause the system to perform operations comprising:

receiving a request from a user intended to be filled by a digital assistant;

extracting a user intent from the request;

deriving a skill from the intent;

assembling a score for the skill for each of a plurality of digital assistants;

ranking each of the plurality of digital assistants by the score; and responsive to the ranking, taking an action to effectuate the user intent, the action comprising engaging a top ranked digital assistant or presenting a number of ranked digital assistants to the user along with explanatory information.

Example 11

The system of example 10 further comprising collecting completion data comprising one or more of:

an indication of whether or not the request was completed;

a time measure of how long the request took until completion or abandonment; and a dialog step measure of how many steps in a dialog until completion or abandonment.

Example 12

The system of example 10 further comprising collecting explicit or implicit user information comprising one or more of:
which digital assistant the user prefers;
a relative indication of whether the user prefers one digital assistant attribute over another; and
an indication of a digital assistant attribute the user prefers.

Example 13

The system of example 10 further comprising enumerating skills implemented by the plurality of digital assistants and mapping the enumerated skills into a taxonomy used to describe all enumerated skills.

Example 14

The system of example 10 further comprising adjusting the score based on explicit or implicit user preference information.

Example 15

A computer storage medium comprising executable instructions that, when executed by a processor of a machine, cause the machine to perform acts comprising:
receiving a request from a user intended to be filled by a digital assistant;
extracting a user intent from the request;
submitting the user intent to a trained machine learning model to identify at least one digital assistant capable of filling the request from among a plurality of digital assistants, the trained machine learning model being trained on a set of data gathered from the plurality of digital assistants and a plurality of users; and
responsive to identifying the at least one digital assistant, taking an action to effectuate the user intent, the action comprising engaging a digital assistant from among the at least one digital assistant utilizing the request or presenting the at least one digital assistant to the user along with explanatory information.

Example 16

A computer implemented method, comprising:
receiving a request from a user intended to be filled by a digital assistant;
extracting a user intent from the request;
identifying at least one digital assistant capable of fulfilling the quest from among a plurality of digital assistants, comprising one or more of:
submitting the user intent to a trained machine learning model being trained on a set of data gathered from the plurality of digital assistants and a plurality of users; and
utilizing a process or a set of rules to select a digital assistant based on the intent; and
responsive to identifying the at least one digital assistant, taking an action to effectuate the user intent, the action comprising engaging a digital assistant from among the at least one digital assistant utilizing the request or presenting the at least one digital assistant to the user along with explanatory information.

Example 17

The method of example 16 wherein the action comprises presenting the at least one digital assistant to the user along with explanatory information.

Example 18

The method of example 17 wherein the explanatory information comprises one or more statements derived from statistical information about the associated digital assistant.

Example 19

The method of example 16, 17, or 18 further comprising:

receiving a selection from the user indicating one of the at least one digital assistants that should be engaged; and
engaging the selected digital assistant utilizing the request.

Example 20

The method of example 16, 17, or 18 wherein the action comprises engaging a digital assistant from among the at least one digital assistant.

Example 21

The method of example 16, 17, 18, 19 or 20 further comprising collecting completion data comprising one or more of:
an indication of whether or not the request was completed;
a time measure of how long the request took until completion or abandonment; and
a dialog step measure of how many steps in a dialog until completion or abandonment.

Example 22

The method of example 16, 17, 18, 19, 20 or 21 further comprising collecting explicit or implicit user information comprising one or more of:
which digital assistant the user prefers;
a relative indication of whether the user prefers one digital assistant attribute over another; and
an indication of a digital assistant attribute the user prefers.

Example 23

The method of example 16, 17, 18, 19, 20, 21, or 22 further comprising enumerating skills implemented by the plurality of digital assistants and mapping the enumerated skills into a taxonomy used to describe all enumerated skills.

Example 24

The method of example 16, 17, 18, 19, 20, 21, 22, or 23 wherein the set of data used to train the trained machine learning model comprises a plurality of:
a request received from a user;
an intent derived from the request;
a domain associated with the intent;
whether or not the request was completed;

skills implemented by a digital assistant;

percentage representing a number of times the request was successfully completed by the digital assistant;

user feedback indicating a preference for the digital assistant;

user feedback indicating a preference for a characteristic of the digital assistant;

a time measure indicating how long the request took to completion or abandonment; and a step measure indicating how many steps in a dialog were performed before completion or abandonment.

Example 25

The method of example 24 wherein at least some the set of data used to train the trained machine learning model is aggregated on one or more of:
a per user basis;
a per cohort basis;
a user population basis;
a per intent basis;
a per intent group basis;
a per domain basis;
a per domain group basis; and
a per query basis.

Example 26

The method of example 16, 17, 18, 19, 20, 21, 22, 23, 24, or 25 wherein the process comprises operations comprising:

receiving a request from a user intended to be filled by a digital assistant;

extracting a user intent from the request;

deriving a skill from the intent;

assembling a score for the skill for each of a plurality of digital assistants;

ranking each of the plurality of digital assistants by the score; and responsive to the ranking, taking an action to effectuate the user intent, the action comprising engaging a top ranked digital assistant or presenting a number of ranked digital assistants to the user along with explanatory information.

Example 27

The method of example 26 wherein one or more of the operations of the process is performed by a trained machine learning model.

Example 28

The method of example 16, 17, 18, 19, 20, 21, 22, 23, 24, 25, 26, or 27 further comprising collecting completion data comprising one or more of:

an indication of whether or not the request was completed;

a time measure of how long the request took until completion or abandonment; and a dialog step measure of how many steps in a dialog until completion or abandonment.

Example 29

An apparatus comprising means to perform a method as in any preceding example.

Example 30

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method implemented on a computer executing instructions to provide a meta digital assistant to users via a computer network, the method comprising:

receiving, at the computer, input representing a request from a user intended to be filled by a digital assistant having machine executable instructions configured to accomplish a designed task when executed;

upon receiving the data representing the request, extracting, with the meta digital assistant, a user intent from the input representing the request, the user intent indicating a target task desired by the user;

identifying, with the meta digital assistant, a digital assistant capable of fulfilling the target task desired by the user from among a plurality of digital assistants, including:

submitting the extracted user intent to a trained machine learning model to identify two or more candidate digital assistants whose corresponding designed task matches the target task desired by the user from the extracted user intent, the machine learning model being trained on a set of designed task data gathered from the plurality of digital assistants and a plurality of user intents extracted from a plurality of requests from users, wherein each of the two or more identified candidate digital assistants is capable of intelligently interacting in conversation with the user to accomplish the target task; and utilizing a set of rules to select the digital assistant from the two or more identified candidate digital assistants based on the extracted user intent; and responsive to selecting the digital assistant, invoking, by the meta digital assistant, the selected digital assistant to execute corresponding machine executable instructions to interact in conversation with the user to accomplish the corresponding designed task to effectuate the extracted user intent, wherein each of the two or more identified candidate digital assistants has a skill that causes the digital assistant to be capable of intelligently interactively interacting in conversation with the user to accomplish at least one particular task, such that at least one of the two or more identified candidate digital assistants is capable of accomplishing a different particular task than another of the two or more identified candidate digital assistants.

2. The method of claim 1, further comprising responsive to identifying the digital assistant, presenting the two or more identified candidate digital assistants to the user along with explanatory information.

3. The method of claim 2 further comprising:
- receiving a selection from the user indicating that one of the two or more identified candidate digital assistants should be engaged; and
- in response to the received selection, invoking, by the meta digital assistant, the identified digital assistant to execute corresponding machine executable instructions to accomplish the corresponding designed task to effectuate the extracted user intent.

4. The method of claim 1 further comprising collecting completion data comprising one or more of:
- an indication of whether or not the request was completed;
- a time measure of how long the request took until completion or abandonment; or
- a dialog step measure of how many steps in a dialog until completion or abandonment.

5. The method of claim 1 further comprising collecting one or more of:
- which one or more of the identified candidate digital assistants the user prefers;
- a relative indication of whether the user prefers one digital assistant attribute over another; or
- an indication of a digital assistant attribute the user prefers.

6. The method of claim 1, further comprising enumerating skills implemented by the plurality of digital assistants and mapping the enumerated skills into a taxonomy used to describe all enumerated skills implemented by the plurality of digital assistants.

7. The method of claim 1 wherein the set of designed task data used to train the machine learning model comprises:
- a request received from a user;
- an intent derived from the request;
- a domain associated with the intent;
- whether or not the request was completed;
- skills implemented by a digital assistant;
- percentage representing a number of times the request was successfully completed by the digital assistant;
- user feedback indicating a preference for the digital assistant;
- user feedback indicating a preference for a characteristic of the digital assistant;
- a time measure indicating how long the request took to completion or abandonment; and
- a step measure indicating how many steps in a dialog were performed before completion or abandonment.

8. The method of claim 7 wherein at least some of the set of data used to train the machine learning model is aggregated on one or more of:
- a per user basis;
- a per cohort basis;
- a user population basis;
- a per intent basis;
- a per intent group basis;
- a per domain basis;
- a per domain group basis; and
- a per query basis.

9. A computer system, comprising:
- a processor and device-storage media having executable instructions which, when executed by the processor, cause the computer system to provide a meta digital assistant and to perform operations comprising:
  - receiving, at the computer system, input representing a request from a user intended to be filled by a digital assistant having machine executable instructions configured to accomplish a designed task when executed;
  - upon receiving the data representing the request, extracting, with the meta digital assistant, a user intent from the input representing the request, the user intent indicating a target task desired by the user;
  - based on the extracted user intent, deriving an intended skill used to achieve the extracted user intent;
  - identifying, with the meta digital assistant, a digital assistant capable of fulfilling the target task desired by the user from among a plurality of digital assistants, including:
    - submitting the extracted user intent to a trained machine learning model to identify two or more candidate digital assistants whose corresponding designed task matches the target task from the extracted user intent, the machine learning model being trained on a set of designed task data gathered from the plurality of digital assistants and a plurality of user intents extracted from a plurality of requests from users, wherein each of the two or more identified candidate digital assistants is capable of intelligently interacting in conversation with the user to accomplish the target task;
    - assembling a score for performing the skill for each of the two or more candidate digital assistants;
    - ranking the two or more candidate digital assistants by the assembled score to identify the digital assistant as a top ranked digital assistant; and
  - responsive to the ranking, invoking, by the meta digital assistant, the identified top ranked digital assistant to execute corresponding machine executable instructions to interact in conversation with the user to accomplish the corresponding designed task to effectuate the user intent, wherein each of the two or more identified candidate digital assistants has a candidate skill that causes the digital assistant to be capable of intelligently interactively interacting in conversation with the user to accomplish at least one particular task, such that at least one of the two or more identified candidate digital assistants is capable of accomplishing a different particular task than another of the two or more identified candidate digital assistants.

10. The computer system of claim 9 wherein the operations further comprise presenting the top ranked digital assistant to the user along with explanatory information.

11. The computer system of claim 10 wherein the operations further include:
- receiving a selection from the user indicating that one of the candidate digital assistants should be engaged; and
- in response to the received selection, invoking, by the meta digital assistant, the identified digital assistant to execute corresponding machine executable instructions to accomplish the corresponding designed task to effectuate the extracted user intent.

12. The computer system of claim 11 wherein deriving the intended skill from the intent comprises one or more of:
- utilizing a set of rules or a data mapping to derive a-the intended skill from the user intent; or
- utilizing a trained machine learning model to derive a-the intended skill from the user intent.

13. The computer system of claim 9 wherein the operations further comprise responsive to identifying the digital assistant, presenting the two or more identified candidate digital assistants to the user.

14. The computer system of claim 9 further comprising collecting completion data of one or more of:
   an indication of whether or not the request was completed;
   a time measure of how long the request took until completion or abandonment; or
   a dialog step measure of how many steps in a dialog until completion or abandonment.

15. The computer system of claim 9 further comprising collecting explicit or implicit user information comprising one or more of:
   which digital assistant the user prefers;
   a relative indication of whether the user prefers one digital assistant attribute over another; or
   an indication of a digital assistant attribute the user prefers.

16. The computer system of claim 9 further comprising enumerating skills implemented by the plurality of digital assistants and mapping the enumerated skills into a taxonomy used to describe all enumerated skills implemented by the plurality of digital assistants.

17. The computer system of claim 9 further comprising adjusting the score based on explicit or implicit user preference information.

18. A computer storage medium comprising executable instructions that, when executed by a processor of a computer, cause the computer to provide a meta digital assistant and to perform acts comprising:
   receiving, at the computer, input representing a request from a user intended to be filled by a digital assistant having machine executable instructions configured to accomplish a designed task when executed;
   upon receiving the data representing the request, extracting, with the meta digital assistant, a user intent from the input representing the request, the user intent indicating a target task desired by the user;
   submitting the extracted user intent to a trained machine learning model to identify two or more digital assistants whose corresponding configured task matches the target task from the extracted user intent and is capable of fulfilling the request from among a plurality of digital assistants, the trained machine learning model being trained on a set of designed task data gathered from the plurality of digital assistants and a plurality of user intents extracted from a plurality of requests from users, wherein each of the two or more identified candidate digital assistants is capable of intelligently interacting in conversation with the user to accomplish the target task;
   selecting one digital assistant of the two or more digital assistants; and
   responsive to selecting the digital assistant, invoking, by the meta digital assistant, the selected digital assistant to execute corresponding machine executable instructions to interact in conversation with the user to accomplish the corresponding designed task to effectuate the extracted user intent, wherein each of the two or more identified candidate digital assistants has a skill that causes the digital assistant to be capable of intelligently interactively interacting in conversation with the user to accomplish at least one particular task, such that at least one of the two or more identified candidate digital assistants is capable of accomplishing a different particular task than another of the two or more identified candidate digital assistants.

19. The computer storage medium of claim 18 wherein the set of designed task data used to train the machine learning model comprises a plurality of:
   a request received from a user;
   an intent derived from the request;
   a domain associated with the intent;
   whether or not the request was completed;
   skills implemented by a digital assistant;
   percentage representing a number of times the request was successfully completed by the digital assistant;
   user feedback indicating a preference for the digital assistant;
   user feedback indicating a preference for a characteristic of the digital assistant;
   a time measure indicating how long the request took to completion or abandonment; and
   a step measure indicating how many steps in a dialog were performed before completion or abandonment.

* * * * *